(12) United States Patent
Maruyama et al.

(10) Patent No.: US 7,786,886 B2
(45) Date of Patent: Aug. 31, 2010

(54) DISPLAY SYSTEM AND METHOD FOR STEERING WHEEL OF VEHICLE

(75) Inventors: Shuji Maruyama, Inzai (JP); Tomotaka Kurozu, Inzai (JP)

(73) Assignees: Hyundai Motor Company, Seoul (KR); Kia Motors Corporation, Seoul (KR); Hyundai-Kia Motor Japan R & D Center Inc., Inzai (JP)

( * ) Notice: Subject to any disclaimer, the term of this patent is extended or adjusted under 35 U.S.C. 154(b) by 342 days.

(21) Appl. No.: 11/949,545

(22) Filed: Dec. 3, 2007

(65) Prior Publication Data

US 2008/0143505 A1 Jun. 19, 2008

(30) Foreign Application Priority Data

Dec. 15, 2006 (KR) ............... 10-2006-0128300
Jan. 10, 2007 (KR) ............... 10-2007-0002873

(51) Int. Cl.
G08B 23/00 (2006.01)
B60Q 1/00 (2006.01)

(52) U.S. Cl. ............ 340/691.6; 340/461; 340/438; 340/691.1; 340/439; 340/441; 340/449; 340/450

(58) Field of Classification Search ............... None
See application file for complete search history.

(56) References Cited

U.S. PATENT DOCUMENTS 4,638,287 A * 1/1987 Umebayashi et al. ....... 340/461

| | | | |
|---|---|---|---|
| 6,739,620 B2 * | 5/2004 | Derrick | 280/731 |
| 7,602,278 B2 * | 10/2009 | Prost-Fin et al. | 340/438 |
| 2006/0146074 A1 * | 7/2006 | Harrison | 345/660 |
| 2008/0023254 A1 * | 1/2008 | Prost-Fin et al. | 180/400 |
| 2008/0061954 A1 * | 3/2008 | Kulas | 340/438 |
| 2009/0108617 A1 * | 4/2009 | Songwe, Jr. | 296/70 |
| 2009/0189373 A1 * | 7/2009 | Schramm et al. | 280/731 |

FOREIGN PATENT DOCUMENTS

| | | |
|---|---|---|
| EP | 1 243 482 A2 | 9/2002 |
| JP | 02-197429 | 8/1990 |
| JP | 2003-276477 | 9/2003 |
| KR | 1020040013758 | 2/2004 |

* cited by examiner

*Primary Examiner*—Julie Lieu
(74) *Attorney, Agent, or Firm*—Morgan, Lewis & Bockius LLP

(57) ABSTRACT

A display system for a steering wheel includes: a vehicle information acquiring unit for acquiring vehicle information; an irradiation unit mounted to the steering column such that the irradiation unit is stationary during rotation of the steering wheel; a display device mounted to the steering wheel; and a display controller for controlling display content based on the vehicle information. A method includes: acquiring vehicle information; detecting a steering direction and/or a steering amount of the steering wheel; calculating a display range and/or a display speed to be displayed based on the steering information; controlling display content, based on information acquired by the vehicle information acquiring unit and a result calculated by the display portion calculating unit; and displaying the steering direction, the steering amount, and/or the steering time at a position on the steering wheel that is stationary during rotation of the steering wheel.

22 Claims, 25 Drawing Sheets

(a) Operating tilt unit      (b) Operating telescopic unit

Greater than 60km/h

DISPLAY SYSTEM AND METHOD FOR STEERING WHEEL OF VEHICLE

CROSS-REFERENCE TO RELATED APPLICATIONS

This application claims the benefit under 35 U.S.C. §119 (a) of Korean Patent Application No. 10-2006-0128300, filed on Dec. 15, 2006, and 10-2007-0002873 filed on Jan. 10, 2007, the entire contents of which are incorporated herein by reference.

BACKGROUND

1. Field of the Invention

The present invention relates to a display system for displaying driving information of a vehicle at a periphery of a steering wheel and a method thereof, and more particularly to a display system in which a steering wheel receives light irradiated from a light source on the steering column.

2. Discussion of Related Art

Several steering wheel display devices are known. For example, Japanese unexamined patent publication No. 2004-148911 discloses a plurality of light emitting diodes at the periphery of the steering wheel. Japanese unexamined patent publication No. 2003-341524 discloses display devices at upper and lower center positions of the steering wheel. Japanese unexamined patent publication No. 2005-88792 discloses a large display device at the periphery of the steering wheel.

However, the known devices have the following disadvantages. First, since the steering wheel rotates, visibility of the information is poor. Second, when the steering wheel is rotated about by 180 degrees, the information is upside down.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A display system for a steering wheel includes: a vehicle information acquiring unit for acquiring vehicle information; an irradiation unit mounted to the steering column such that the irradiation unit is stationary during rotation of the steering wheel; a display device mounted to the steering wheel; and a display controller for controlling display content based on the vehicle information.

The irradiation unit moves along with the steering column during adjustment of a position and tilt of the steering wheel. The irradiation unit transmits light to a predetermined portion of the steering wheel, such as at the top of the steering wheel. The irradiation unit may include a laser diode, a high luminance light emitting diode, or a thin panel display device.

The display device may include an optical transmittance member disposed at the entire cross section of the steering wheel, an optical transmittance member disposed through the cross section in a straight line, an optical transmittance member disposed through the cross section in a curve, an optical transmittance member installed at a surface of the cross section, and optical transmittance member installed interior to the cross section.

The display content may include a steering direction, a steering amount, and/or a steering timing. The vehicle information acquiring unit may include a lane maintenance device, a lane deviation alarm device, a park support device, a navigation device, and/or an instrument panel controller for controlling information on an instrument panel. The display device displays at least one of an alert signal, a car speed, an engine speed, a power meter, and an eco-meter. The display controller changes the display range and/or display speed of the display device, based on a comparison with at least one predefined threshold value.

The irradiation unit is disposed near the driver's seat. The steering column may have a recess, where the irradiation unit is disposed in the recess. Alternatively, the steering column may have a barrier configured to shade the driver's eyes from diffused light.

A display method includes: acquiring vehicle information; detecting a steering direction and/or a steering amount of the steering wheel; calculating a display range and/or a display speed to be displayed by the display device based on the steering information; controlling display content, based on information acquired by the vehicle information acquiring unit and a result calculated by the display portion calculating unit; and displaying the steering direction, the steering amount, and/or the steering time at a position on the steering wheel that is stationary during rotation of the steering wheel.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a display system and method for displaying various information on the periphery of the steering wheel. The information may include steering direction, steering amount, and steering timing that a driver should take into consideration for upcoming steering. The information is obtainable from a lane maintenance device, a lane deviation alarm device, a park support device, a navigation device, and a vehicle state (alert signal, car speed, engine RPM, power meter, eco-meter). An irradiation unit may include a laser diode, a high luminance light emitting diode, or a thin panel with high luminance such as a vacuum fluorescent display (VFD), plasma display panel (PDP), or organic light-emitting diode (OLED).

Figure 1:
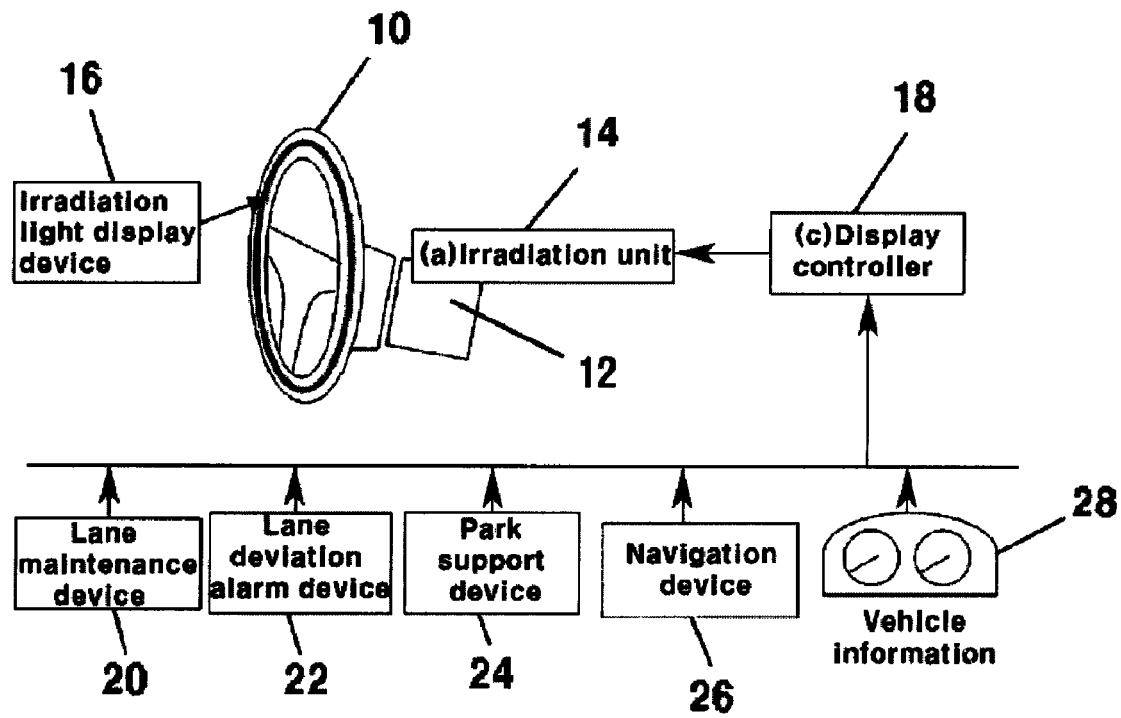
FIG. 1 is a block diagram of a display system for a steering wheel according to an embodiment of the present invention.

FIG. 1 is a block diagram of a display system for a steering wheel according to an embodiment of the present invention.

As shown in FIG. 1, a display system for a steering wheel of a vehicle according to an embodiment of the present invention comprises a vehicle information acquiring unit, an irradiation unit 14 mounted on a steering column 12, a display device 16 such as irradiation light display device installed in a steering wheel 10, and a display controller 18.

The vehicle information acquiring unit gathers vehicle information. The display device 16 is installed at a periphery of the steering wheel 10. The display controller 18 controls display content, a time, a range, and/or a rate of display based on the vehicle information acquired by the vehicle information acquiring unit.

The vehicle information acquiring unit includes a lane maintenance device 20, a lane deviation alarm device 22, a park support device 24, a navigation device 26, and an instrumental panel controller 28 for controlling information on an instrumental panel, which exchange data with the display controller 18.

Figure 2:
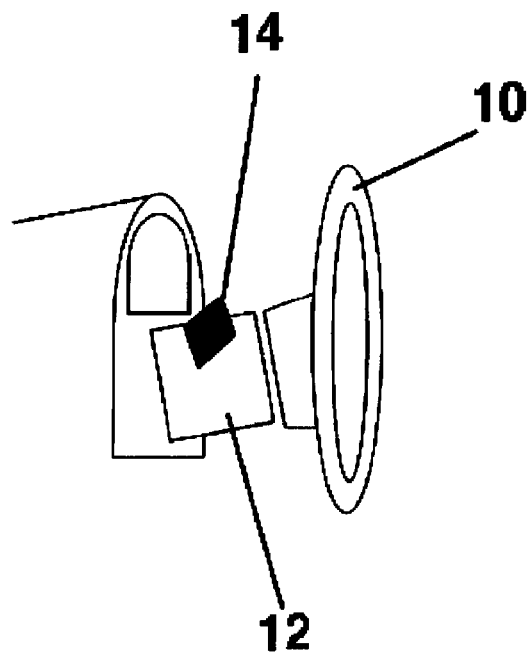
FIG. 2 is a schematic view showing the position of the irradiation unit of FIG. 1.
Figure 3:
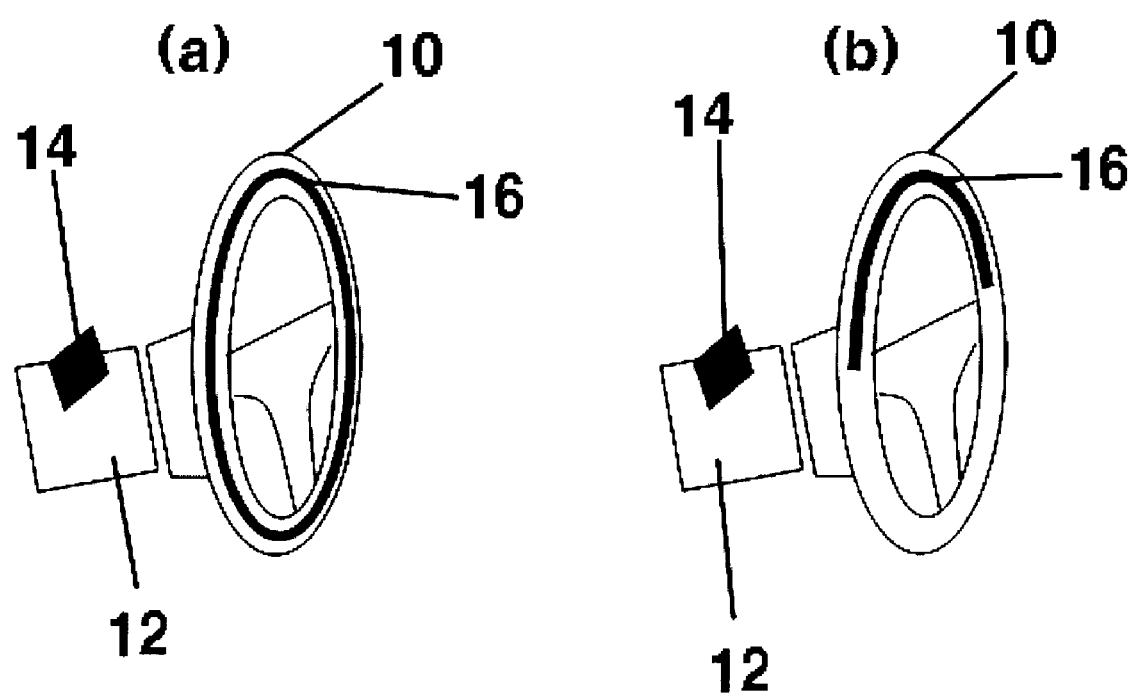
FIG. 3 is a schematic view showing the position of the irradiation light display device of FIG. 1.

Referring to FIG. 2, the irradiation unit 14 is installed at the steering column 12, which is stationary during rotation of the steering wheel 10.

In some preferred embodiments, an irradiation direction of the irradiation unit 14 is toward the top of the steering wheel 10. That is, the display device 16 is installed at all or a part of a periphery of the steering wheel 10, and receives and displays light irradiated by the irradiation unit 14. Further, the display device 16 can always display the irradiated light at the top of the steering wheel 10 regardless of the orientation of the steering wheel 10.

The irradiation unit 14 may include, for example, one or more laser diodes, a high luminance light emitting diode, and/or a thin panel display device.

Figure 4:
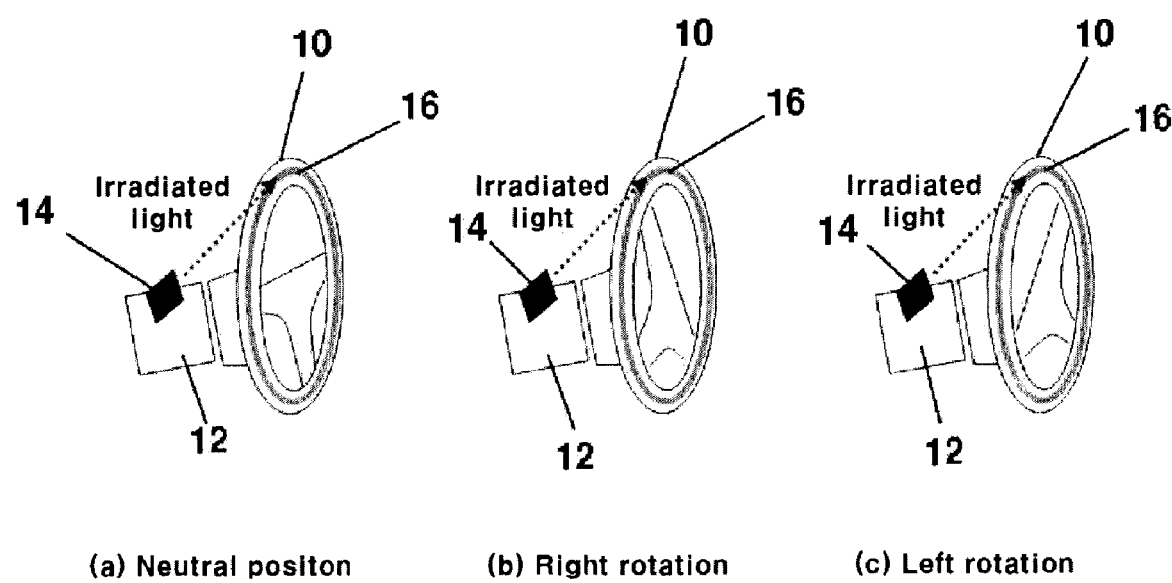
FIG. 4 is a schematic view of the position of the irradiation light when the steering wheel is turned.

The display device 16 may be installed at all or a part of the periphery of the steering wheel 10. As shown in FIG. 4, during a neutral position, a left steering position, and a right steering position, the irradiation unit 14 always irradiates the top of the steering wheel 10.

Figure 7:
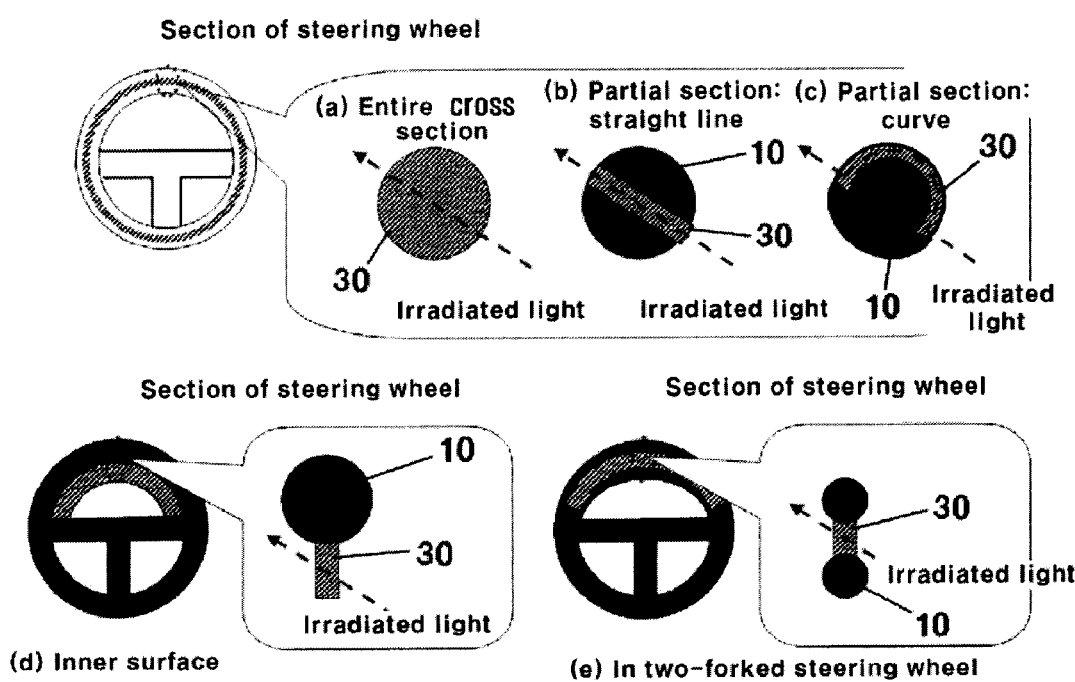
FIG. 7 is a schematic view of exemplary positions of the irradiation light display device.

As shown in FIG. 7, the display device 16 may be embedded in the steering wheel 10 in various manners, for example FIG. 7a shows the entire cross section of the steering wheel 10 the display device 16 comprising an optical transmittance member 30. Alternatively, the optical transmittance member 30 may be disposed in a straight line (refer to FIG. 7b), a curve (refer to FIG. 7c), at an inner surface of the steering wheel 10 (refer to FIG. 7d), or within a hollow cross-section of the steering wheel (refer to FIG. 7e).

It is preferred that the display device 16 is positioned near the top of the steering wheel 10 for visibility.

There are several methods for extending a range of the irradiation light. For example, a movable lens may be employed for varying the optical axis of the light emitted from the irradiation unit. Alternatively, the optical axis can be controlled by using an adjustable irradiation unit. Further, a plurality of irradiation units, with different optical axes, may be provided.

Figure 5:
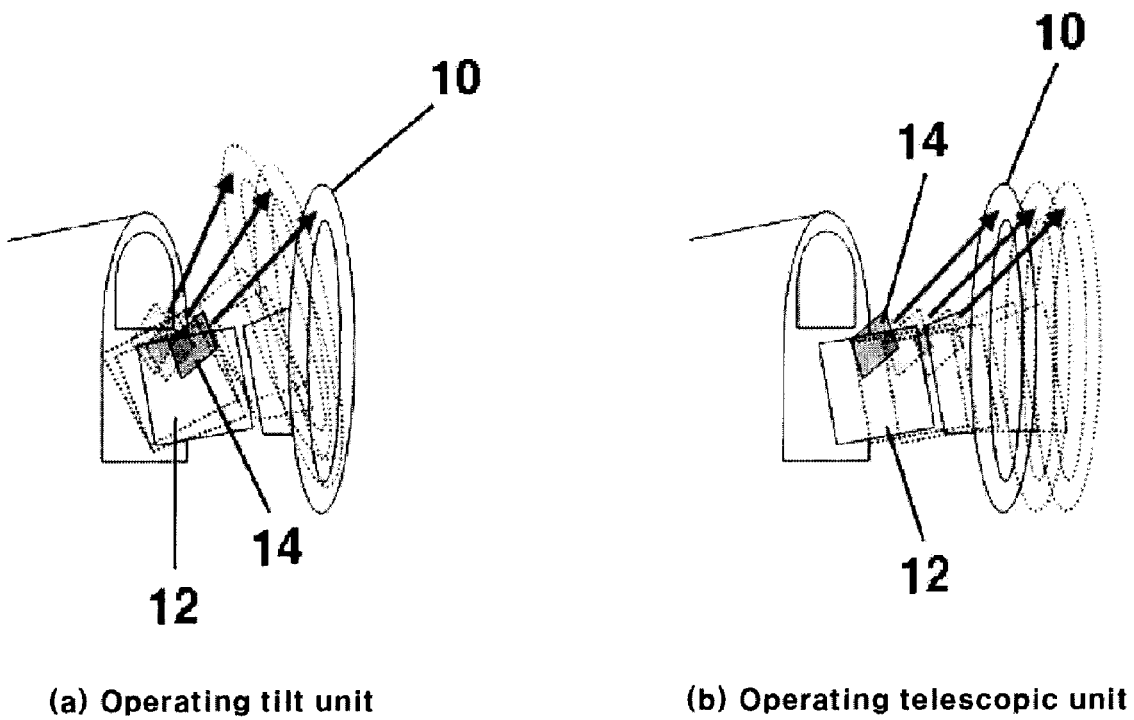
FIG. 5 is a schematic view of the irradiation light during adjustment of the steering wheel.

Referring to FIG. 5, the irradiation unit 14 may be installed at the steering column 12, which is stationary during rotation of the steering wheel 10, but which moves together with the steering wheel 10 during adjustment of the tilt and length of the steering wheel 10 by a steering position adjustment unit. The steering position adjustment unit includes a tilt unit for adjusting an angle of the steering wheel 10 and a telescopic unit for adjusting distance from the driver (not shown).

The irradiation unit 14 may include a thin panel such as a laser diode, a light emitting diode, an organic light emitting diode, a VFD, and a PDP.

The display controller 18 acquires information to be displayed from various devices coupled to a signal line of a vehicle, and determines display contents and time for each of the contents to be displayed. The display controller 18 determines display contents and time based on information received from a lane maintenance device 20, a lane deviation alarm device 22, a park support device 24, a navigation device 26, and other vehicle information acquiring devices.

The irradiation unit 14 receives signals from the display controller 18 and converts the signals into light and emits the light toward the display device 16 and thus the display device 16 receives the irradiated light and projects it toward the driver.

In some preferred embodiments, the display system always displays the information at the top, or another predetermined position, of the steering wheel. In these embodiments, a special steering angle sensor or display portion calculator is not necessary.

Even though information is displayed over a rather wide range of the steering wheel, the irradiation light display device can be inexpensively made, such as of simple optical transmittance material.

In some preferred embodiments, since electrical components are not disposed in moving parts such as the steering wheel, fabrication is simple.

Figure 6:
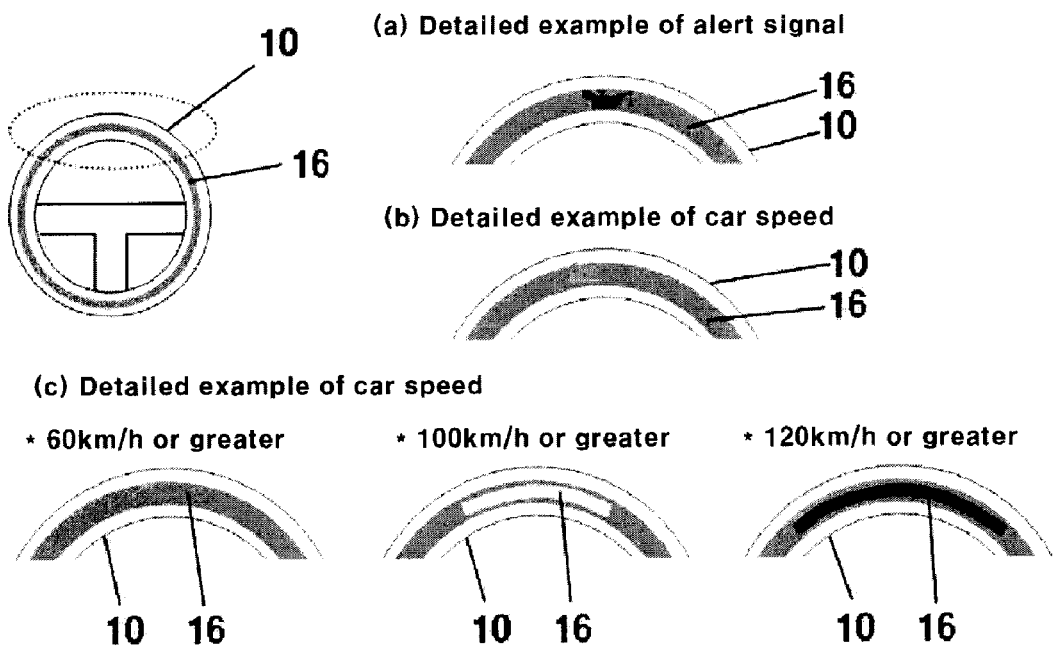
FIG. 6 is a schematic view of the irradiation light display device of a display system for a steering wheel of a vehicle according to the present invention.

Referring now to FIG. 6, the contents displayed on the display device 16 may include steering information as well as state information of the vehicle such as alert signals, car speed, engine RPM, power meter, eco-meter. In addition, in some preferred embodiments, the display device 16 is capable of displaying in color.

In some preferred embodiments, since the irradiated light from the irradiation unit 14 reaches the rear side of the steering wheel, the optical transmittance member 30 is used for transferring the light to a front side of the steering wheel.

Figure 8:
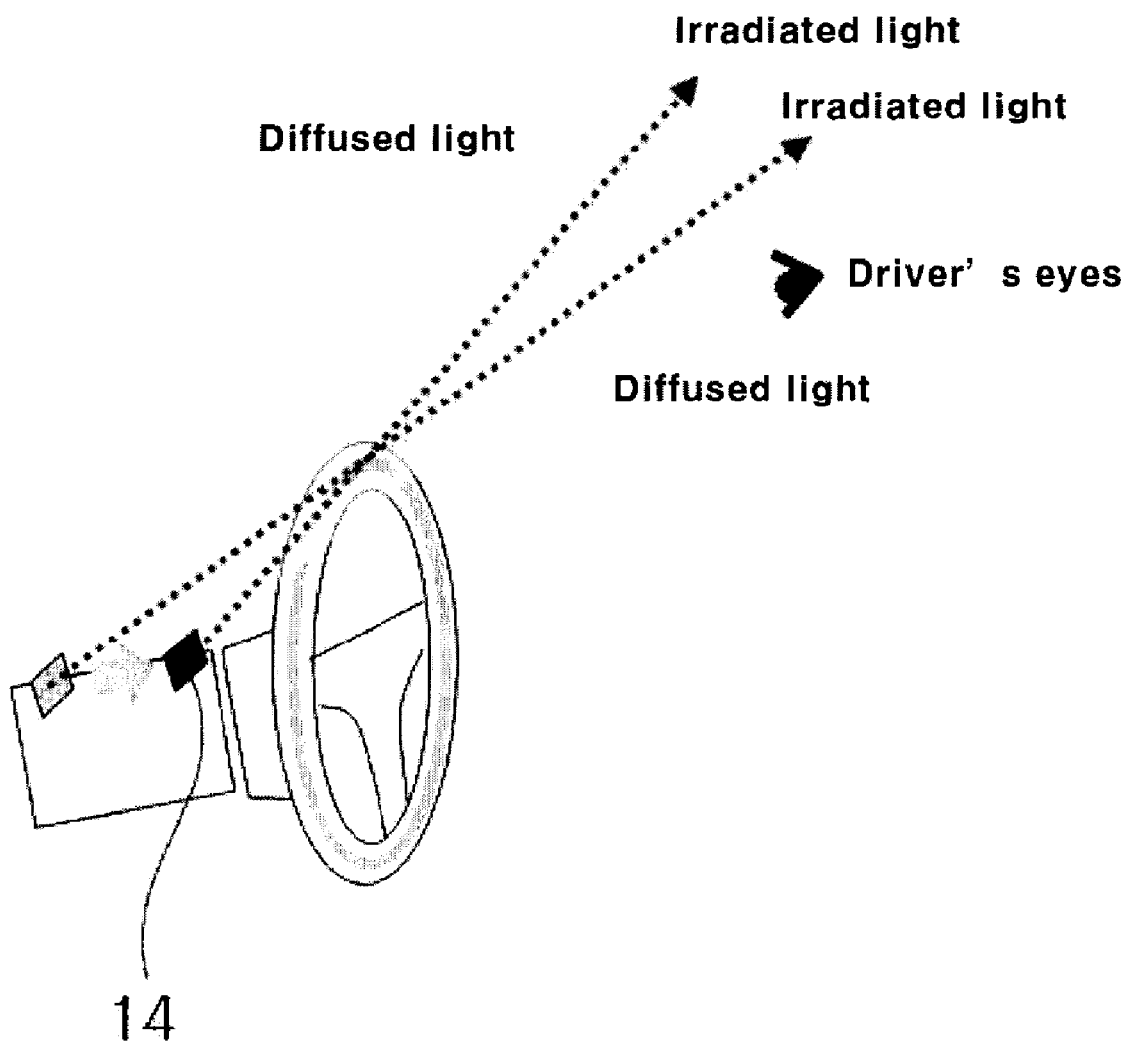
FIG. 8 is a schematic view showing an exemplary position of the irradiation unit, which prevents the driver from being dazzled.

In some preferred embodiments, as shown in FIG. 8, the irradiation unit 14 is positioned as close to the driver as possible, to avoid dazzling or blinding the driver with diffused light from the irradiated light.

Figure 9:
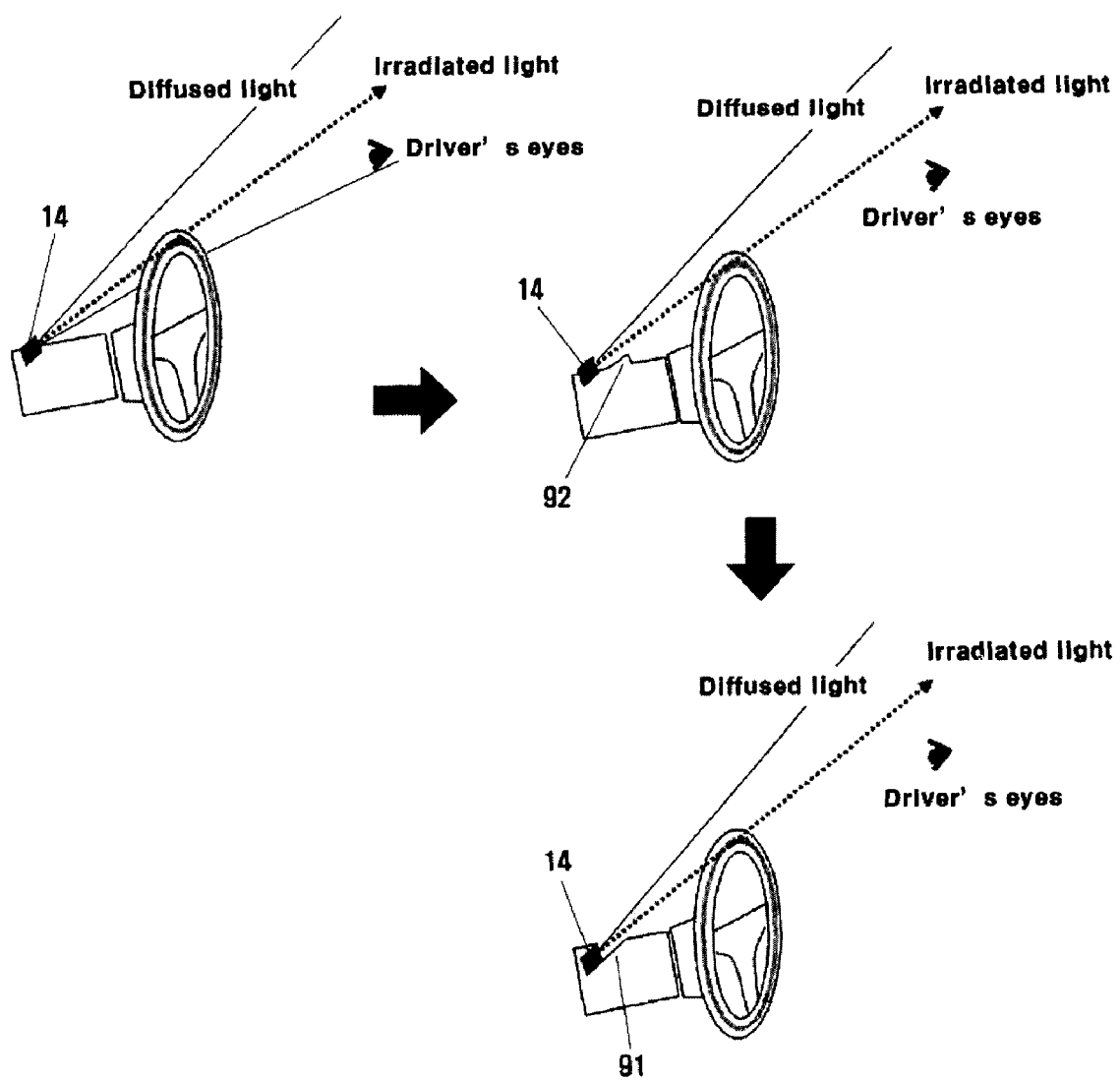
FIG. 9 is a schematic view showing another exemplary position of the irradiation unit.

In addition, as shown in FIG. 9, in an effort to reduce the dazzling, the irradiation unit 14 may be inserted into a recess 91 in the steering column. Alternatively, a steering column may include a barrier 92 to shade the diffusion light from the irradiated light so that the dazzle is reduced.

Figure 10A:
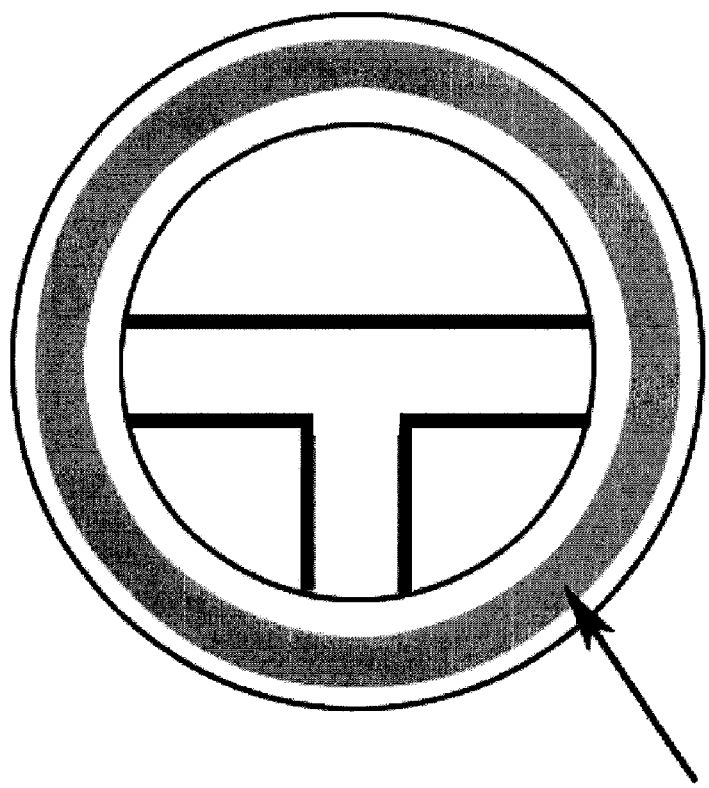
FIG. 10a and FIG. 10b are schematic views showing an exemplary position of a display device.
Figure 10B:
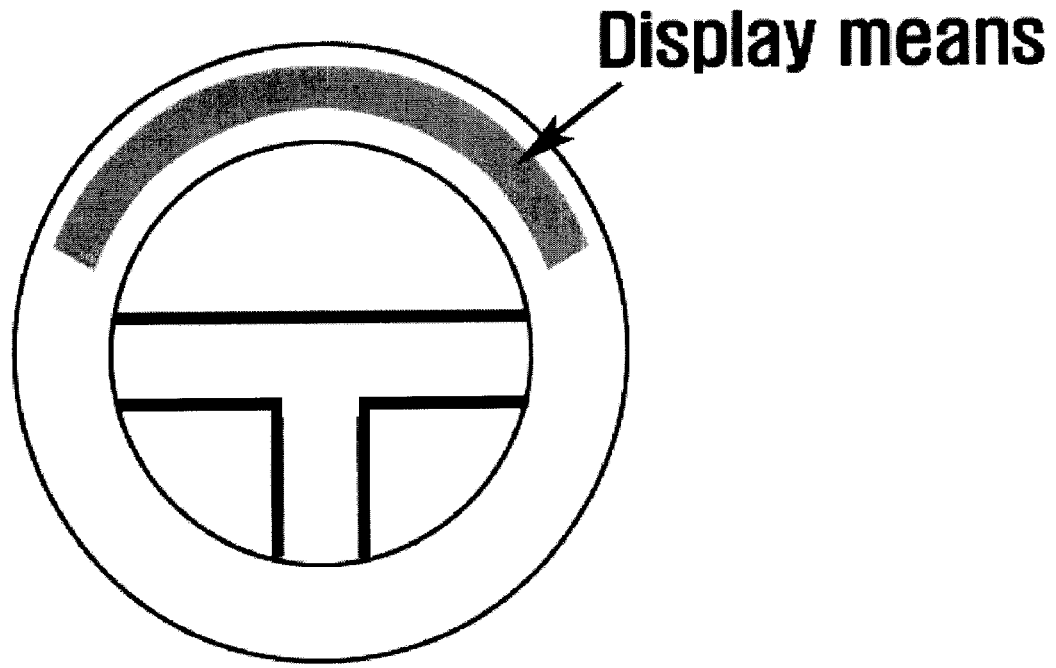
Figure 11A:
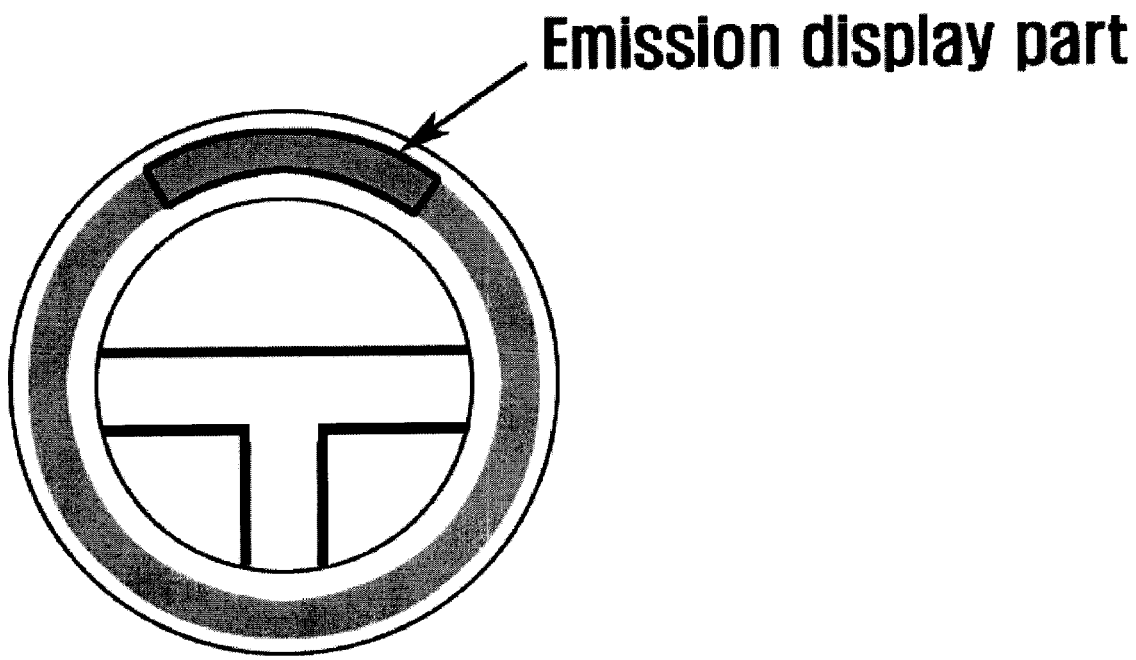
FIG. 11a to FIG. 11c are schematic views showing exemplary positions of an emission display part at various steering angles.
Figure 11B:
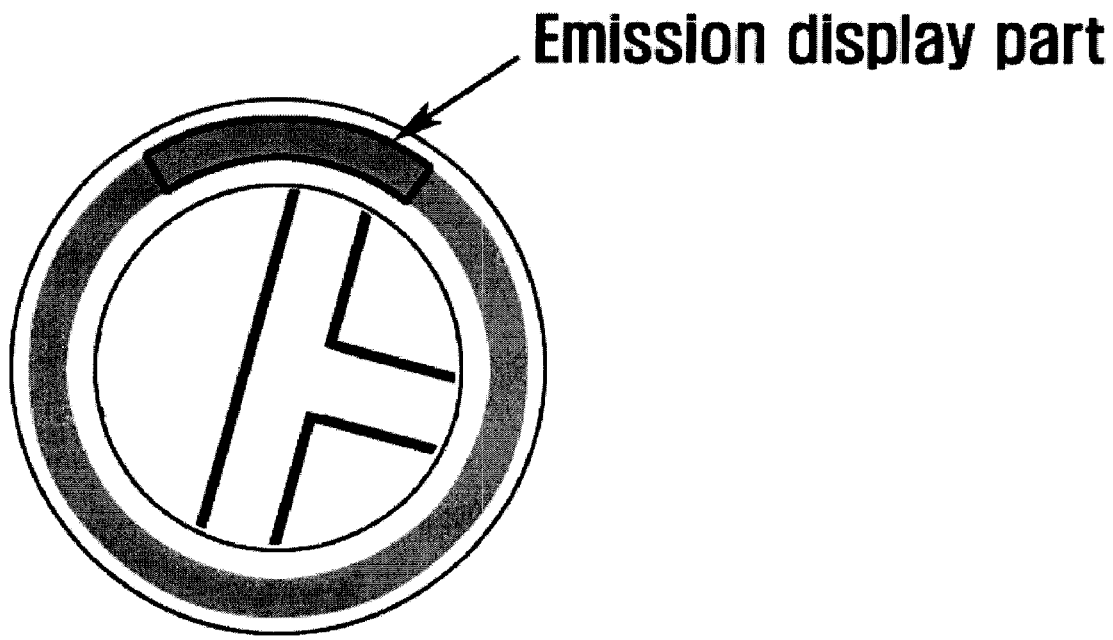
Figure 11C:
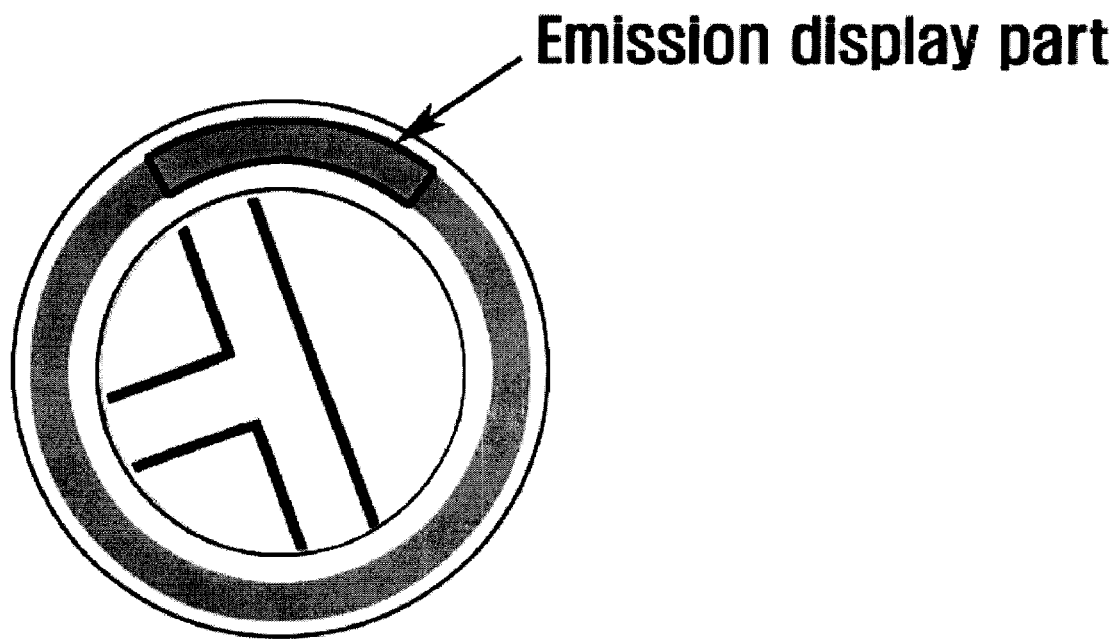

FIG. 10a and FIG. 10b show other embodiments of a display system. As shown in FIG. 10a and FIG. 10b, a display device may be installed at an entire circumference of the steering wheel or symmetrically around the top of the steering wheel. As shown in FIG. 11a to FIG. 11c, in some preferred embodiments, an emission display part is always positioned and displayed at the top of the steering wheel.

Figure 12:
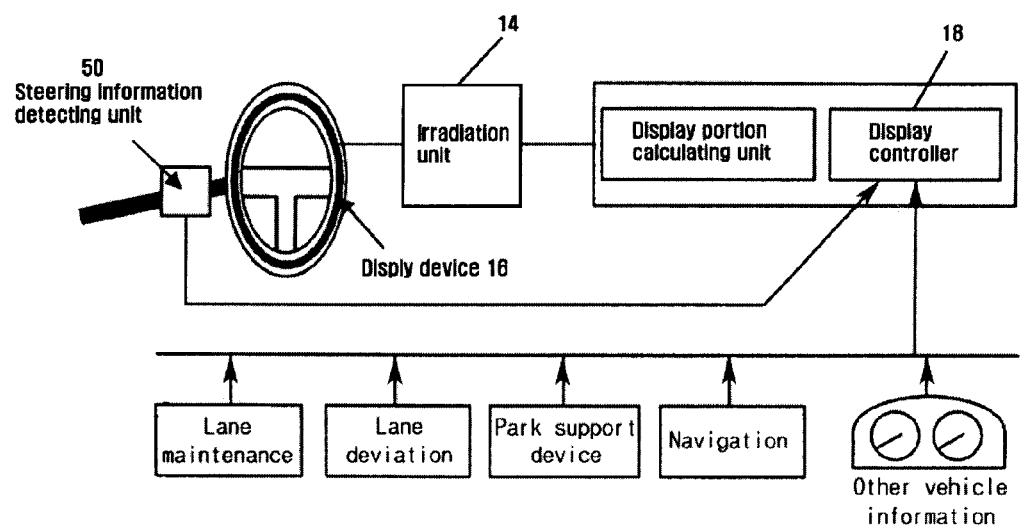
FIG. 12 is a block diagram of an exemplary display system.

FIG. 12 is a block diagram of an exemplary display system. As shown in FIG. 12, in some preferred embodiments, the display system includes a display device 16 installed in the steering wheel; a display controller 18 for controlling display contents and time to be displayed, a steering information detecting unit 50 for detecting a steering direction and/or a steering amount of the steering wheel; a display portion calculating unit 40 for determining an emission display part displayed on the display device 16; and a irradiation unit 14.

When the display controller 18 acquires information to be displayed from the steering information unit detection 50 and the vehicle information acquiring unit, it determines display contents and suitable time to be displayed on the display device 16.

The vehicle information acquiring unit includes a lane maintenance device 20, a lane deviation alarm device 22, a park support device 24, a navigation device 26, and an instrumental panel controller 28 for controlling information on an instrumental panel, which exchange data with the display controller 18.

The display portion calculating unit 40 calculates which part of the display device 16 displays a driver's current steering direction and steering amount based on the command of display controller 18 which decides the display part from the information received from the steering information detecting unit 50 and the vehicle information acquiring unit as mentioned above. The irradiation unit 14 performs a display of contents on the display device 16 in consideration of the calculated results of the display portion calculating unit 40.

Figure 13:
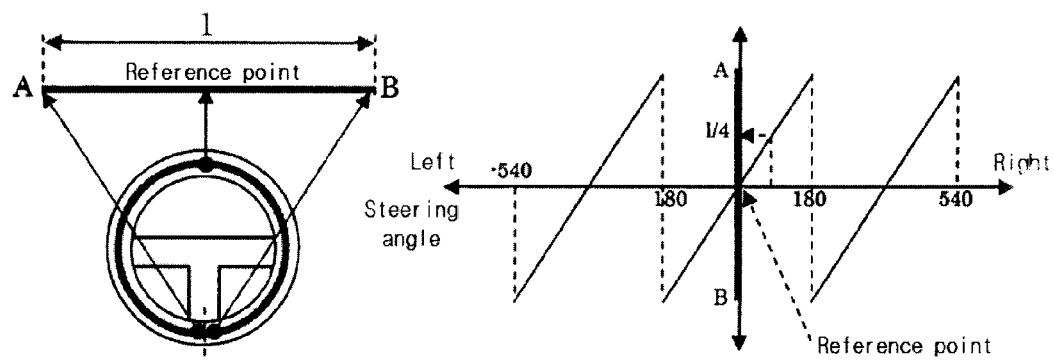
FIG. 13 is a view showing an exemplary procedure of calculating an offset amount from a reference point in a display device according to the present invention.

FIG. 13 is a view showing an exemplary method of calculating an offset amount of steering wheel from a predetermined reference point in a display device 16 according to the present invention. In this figure, the character "A" indicates the maximum left rotational displacement of steering wheel from the predetermined reference point when it is rotated in the left direction and the character "B" shows the maximum right rotational displacement of steering wheel from the predetermined reference point when it is rotated in the right direction in this example. These maximum left and right rotational displacements "A" and "B" of steering wheel occurs repeatedly at each rotational degree of $(\pi+2n\pi)$ (radian) where "n" is the rotation number of steering wheel.

The display portion calculating unit 40 calculates an offset amount of steering wheel from the predetermined reference point in consideration of the current steering information. For example, when the driver turns the steering wheel in right 90 degrees, a part displayed in the display device 16 shows that the steering wheel is offset from the predetermined reference point in left direction by ¼ of the left maximum displacement of "A" as shown in FIG. 13.

The display method of the present invention is characterized in that a steering direction of a vehicle is expressed as the display movement of an emission display part in the display device 16 as shown in FIG. 11, and the steering amount or the steering time of the steering wheel is expressed as the display speed or the display range of the emission display part.

Figure 14A:
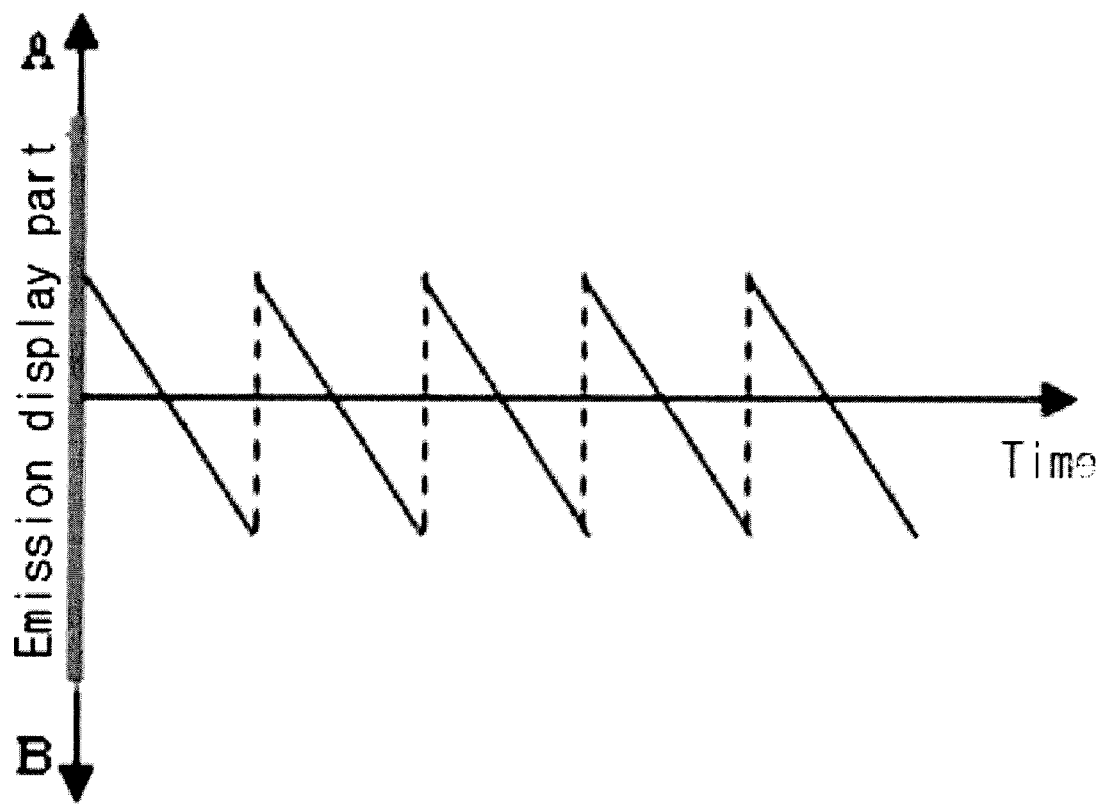
FIG. 14a and FIG. 14b are views showing movement of the display device of the present invention at different steering directions.

For example, when the driver makes the right steering, the driver's right steering motion is expressed, as shown in FIG. 14a, that the emission display part moves from the left direction (i.e., "A" direction) of the display device 16 to the right direction (i.e., "B" direction) in accordance with the saw tooth steering signal.

Figure 14B:
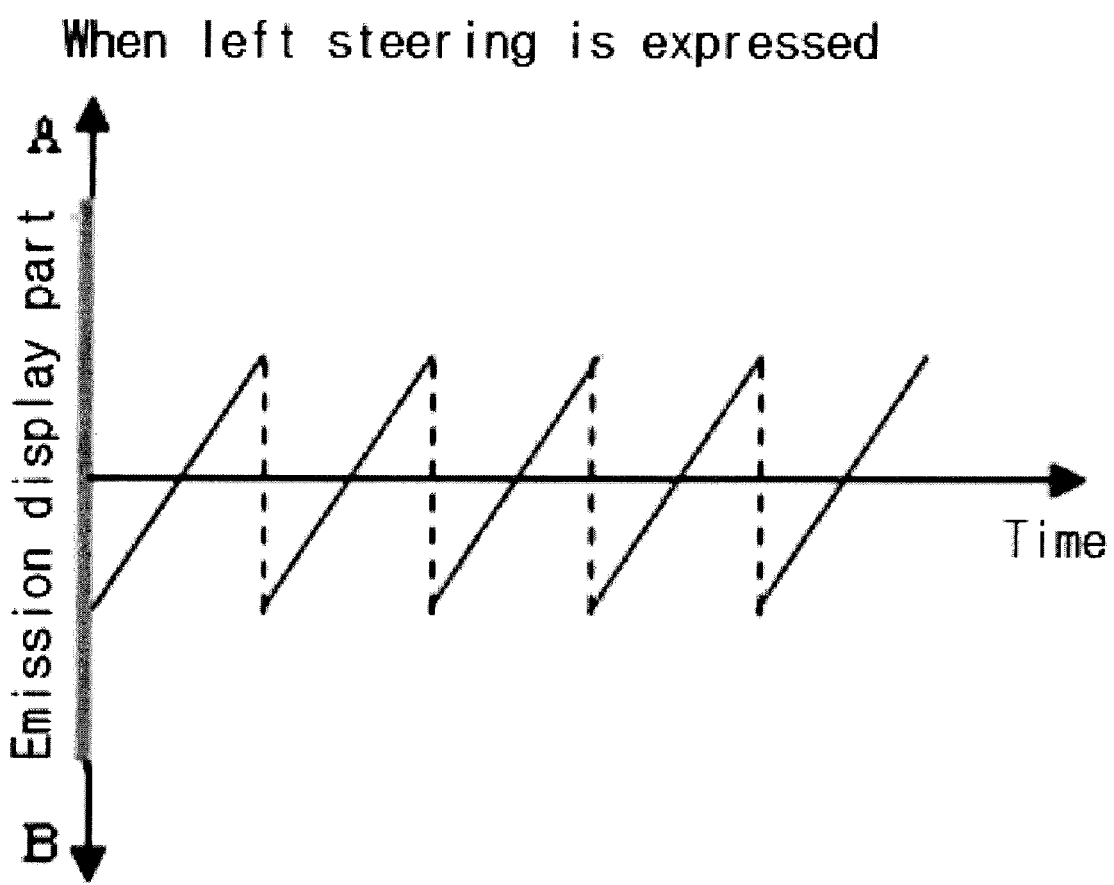

In another instance, when the driver rotates the steering wheel 10 in the left, the driver's left steering motion is expressed, as shown in FIG. 14b, that the emission display part moves from the right direction (i.e., "B" direction) of the display device 16 to the left direction (i.e., "A" direction) with the saw tooth steering signal occurring reversely to the left saw tooth steering signals.

However, in contrast to the method commented above, the controlling of some non-emission display part of the display device 16 may be used in a state that all or most of the display portion emits light.

Hereinafter, a control method of displaying the steering direction of a driver's the steering wheel with an emission display part in the display device 16, has been described.

Figure 15A:
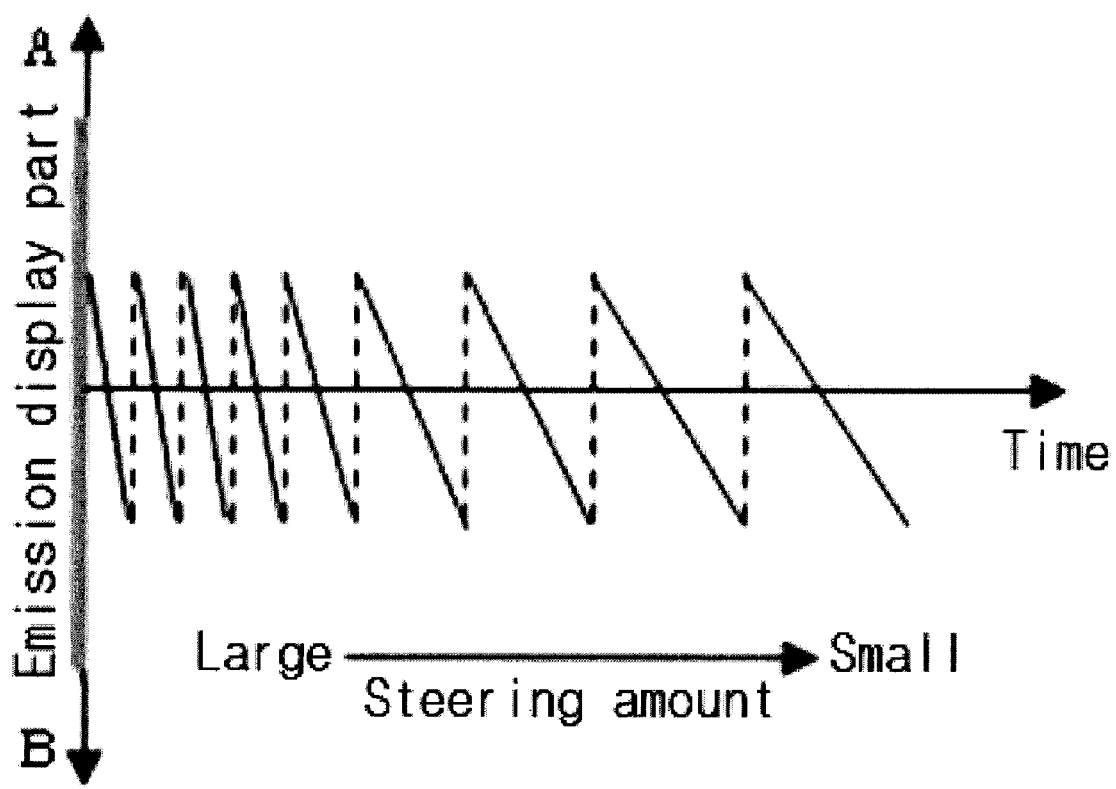
FIG. 15a and FIG. 15b are views showing movement of an emission display part at different steering amounts and lengths to steering time.
Figure 15B:
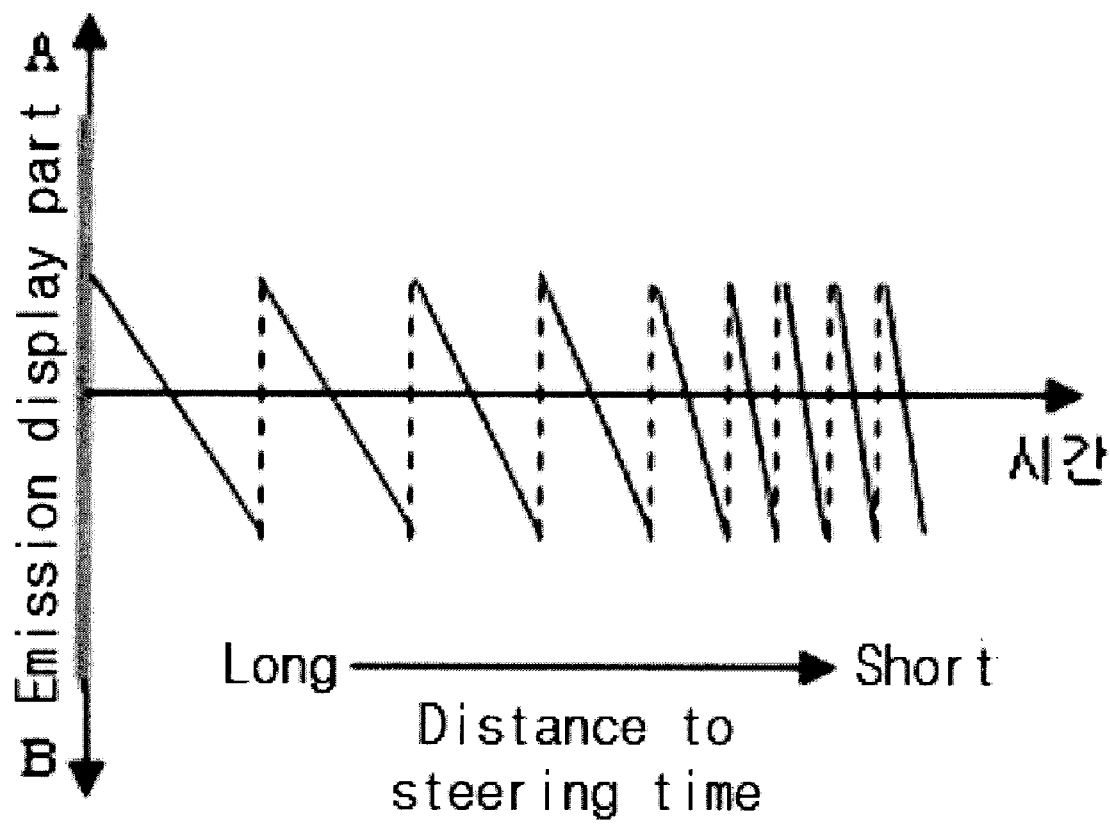

FIG. 15a and FIG. 15b are the other preferred embodiment showing the control method of regulating the display speed of the emission display part according to the steering amount and time length of the steering in the right steering.

In detail, the present invention is characterized in that the display controller 18 reduces movement speed of an emission display part as the amount of steering is decreased, or increases the movement speed of an emission display part as the time length of the steering is decreased.

For example, FIG. 15a shows that the display controller 18 controls the speed of display movement of the emission display part to be decreased as the driver decreases the steering amount and in contrast, FIG. 15b shows that the display controller 18 controls the speed of the display movement of the emission display part to be increased as the steering time is decreased.

FIG. 16a to FIG. 16d are some other embodiments showing the control of the display range of an emission display part. The following is a description of a display method controlling the display range of an emission display part according to driver's steering amount or the time length of steering.

Figure 16A:
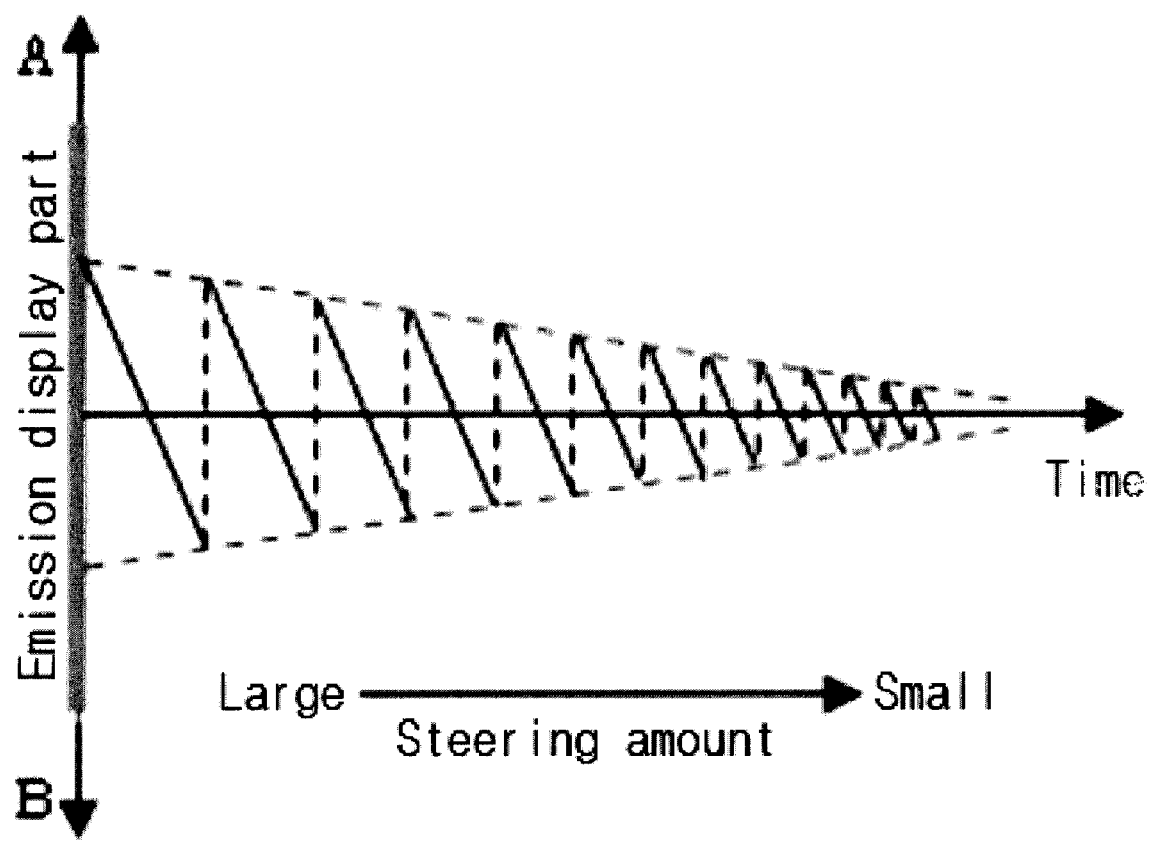
FIG. 16a to FIG. 16d are views showing an emission display range.
Figure 16B:
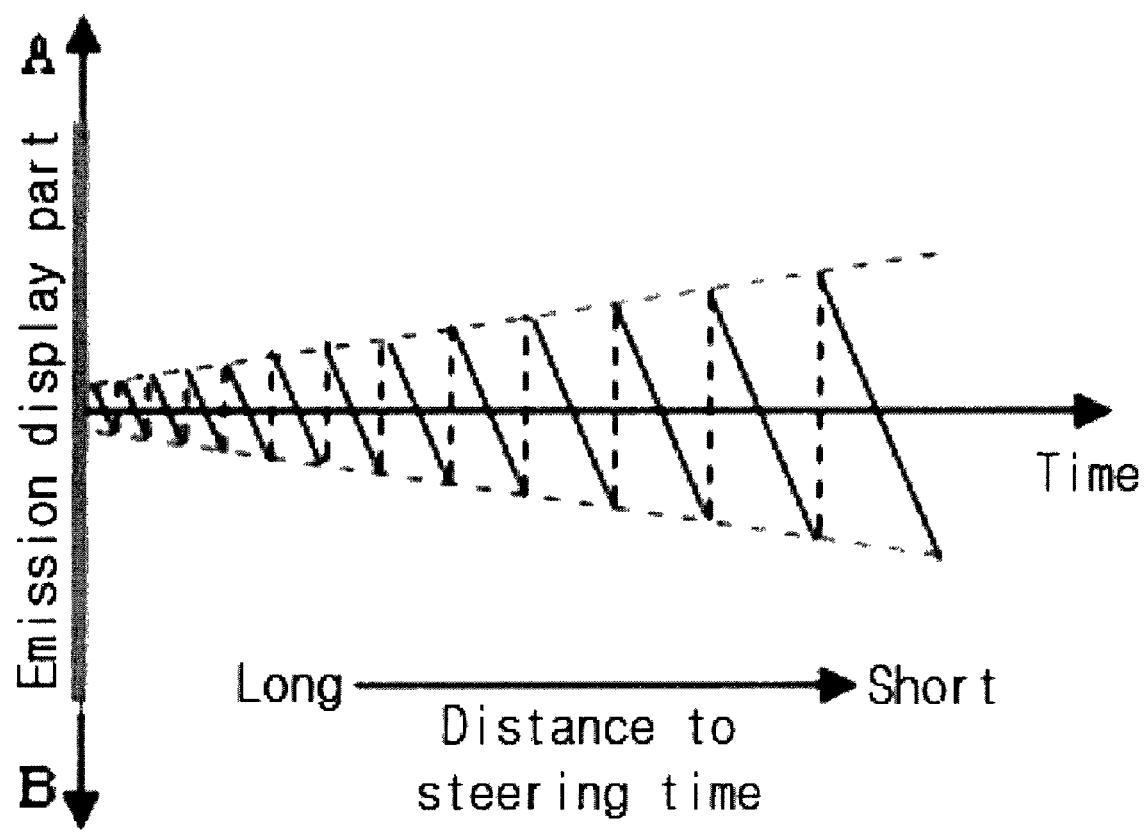
Figure 16C:
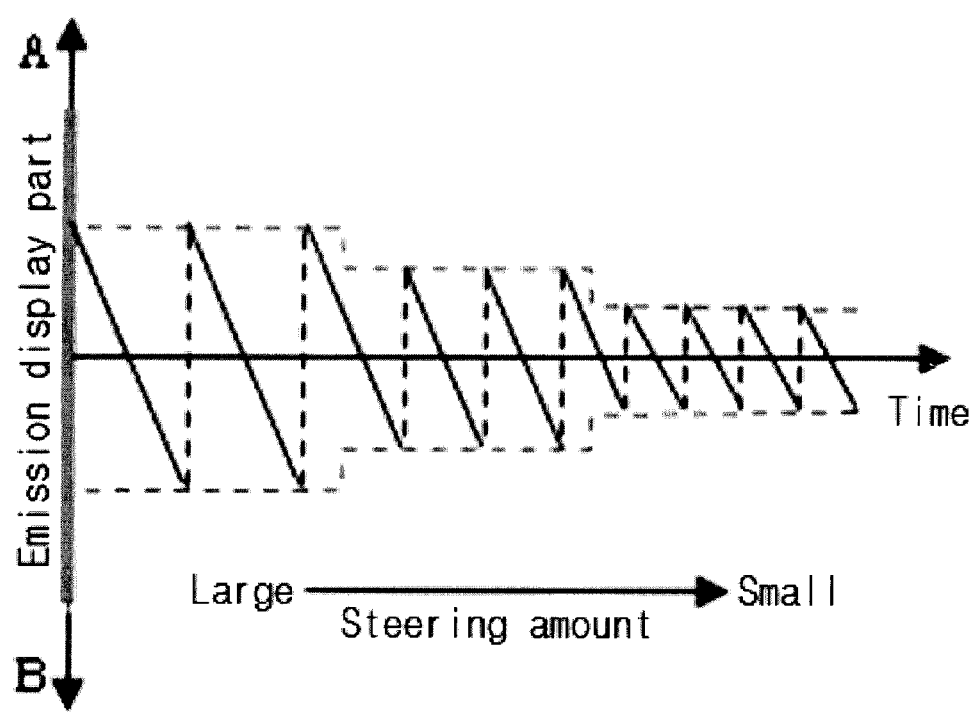
Figure 16D:
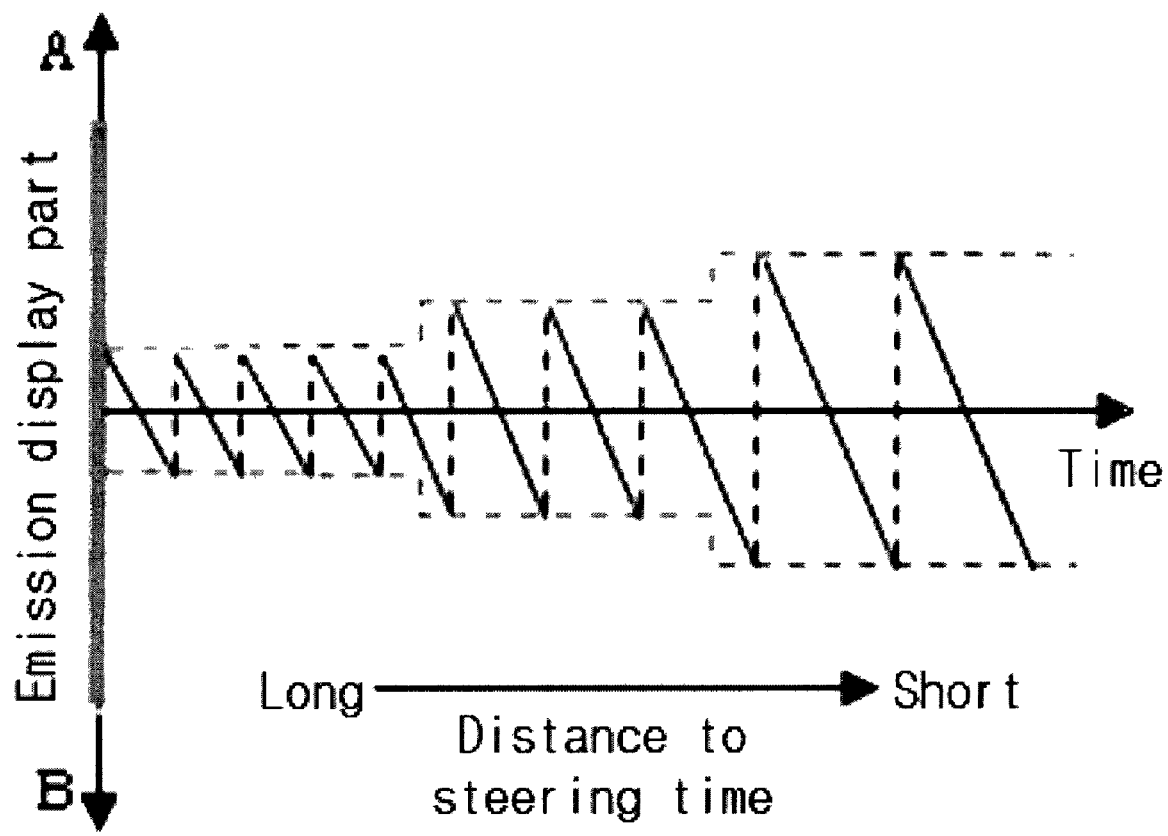

As shown in FIG. 16a or FIG. 16c, as the driver's steering amount is decreased the display controller 18 controls the display range of emission display part of display device 16 to be continuously reduced as shown in FIG. 16a or step-functionally reduced as shown in FIG. 16c Otherwise, as shown in FIG. 16b or FIG. 16d, as the time length of driver's steering is decreased, the display controller 18 controls the emission display range to be continuously increased as shown in FIG. 16b or step-functionally increased as shown in FIG. 16d.

Figure 17A:
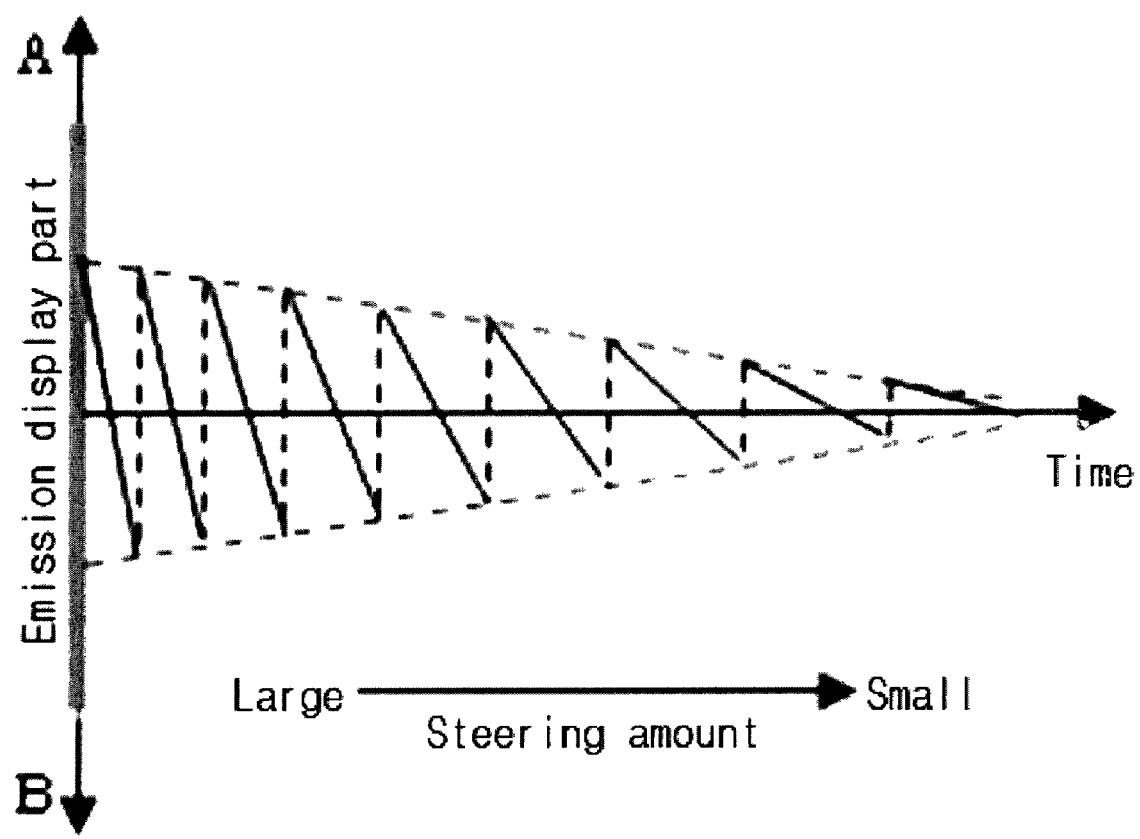
FIG. 17a to FIG. 17d are views showing examples of a steering amount according to a moving speed change of an emission display part and an emission display range limit.
Figure 17B:
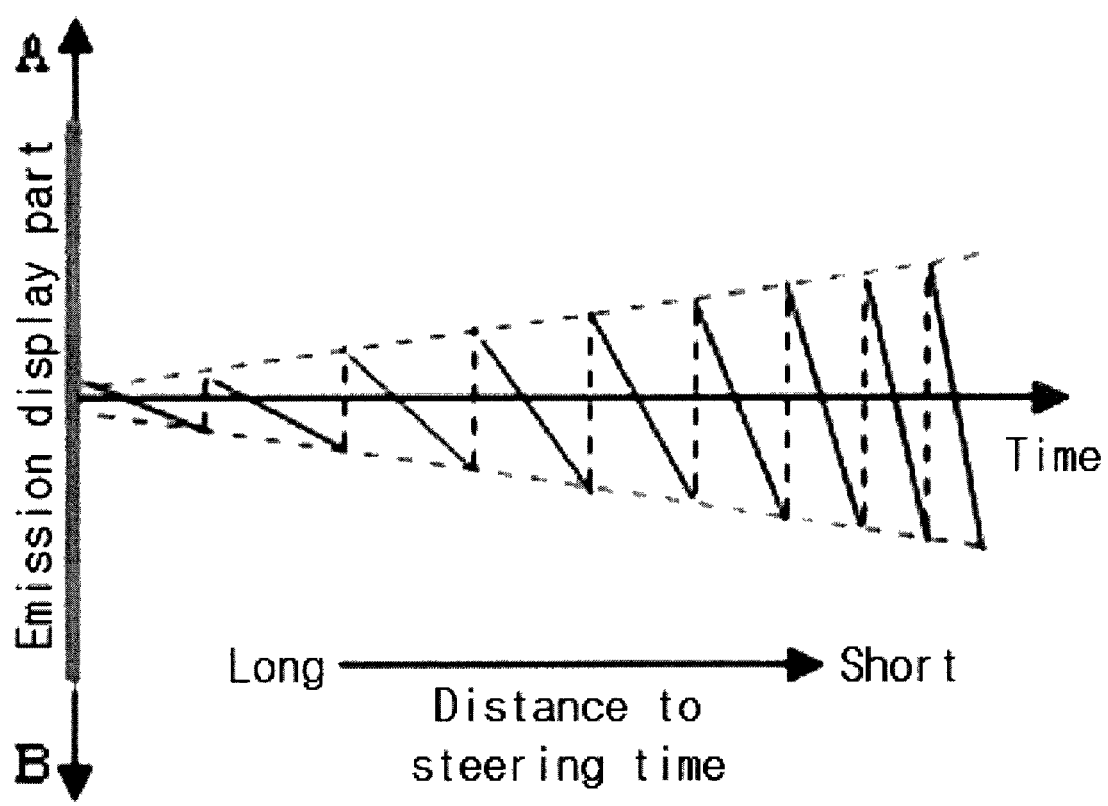

FIG. 17a shows another embodiment of the present invention showing a procedure of continuously controlling the display speed and display range of the emission display part according to the driver's steering amount synchronously. FIG. 17b shows the other embodiment of the present invention showing a procedure of continuously controlling the display speed and the display range of the emission display part according to the time length of the steering synchronously.

As shown in FIG. 17a, as the driver decreases the steering amount, the display controller 18 controls the display speed of the emission display part and the range of display to be decreased synchronously.

Further, as shown in FIG. 17b, as the time length of steering is decreased, the display controller 18 controls the display speed and the display range of the emission display part to be increased synchronously.

Figure 17C:
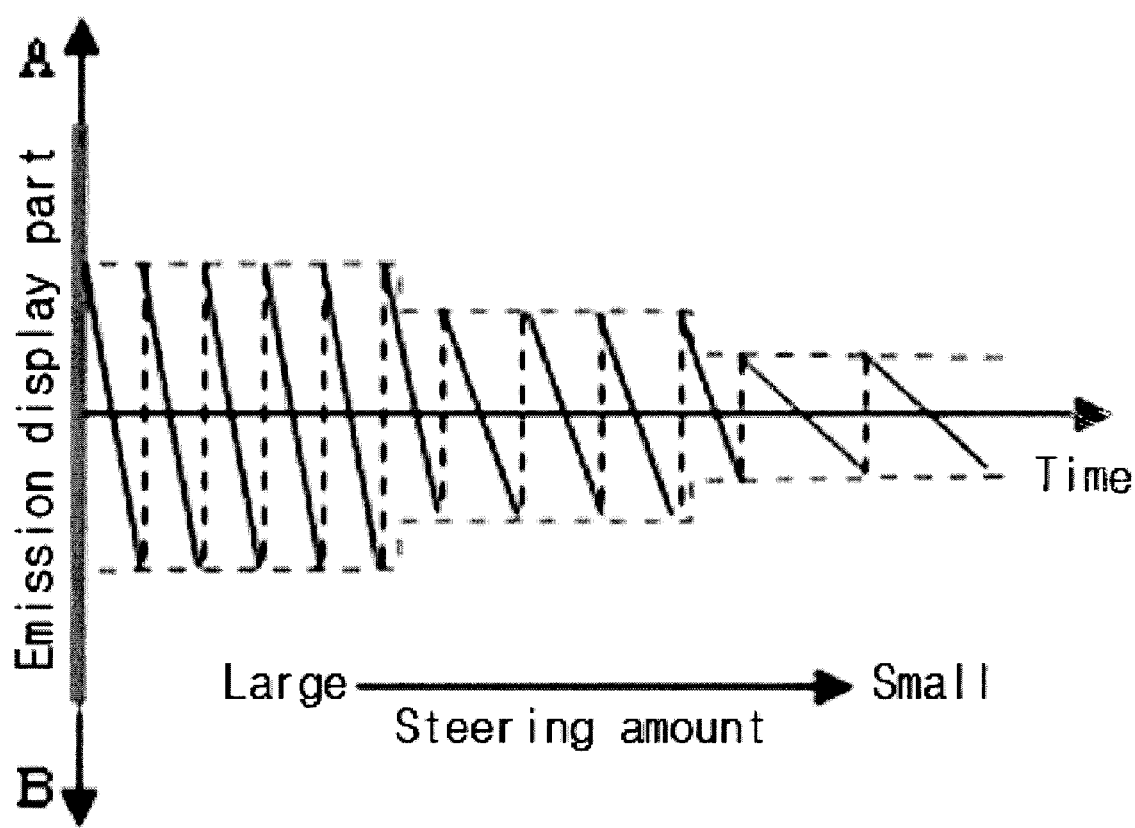

FIG. 17c is the other embodiment of the present invention showing a procedure that as the driver's steering amount is decreased, the display controller 18 controls the display range and display speed of the emission display part to be step-functionally decreased.

Figure 17D:
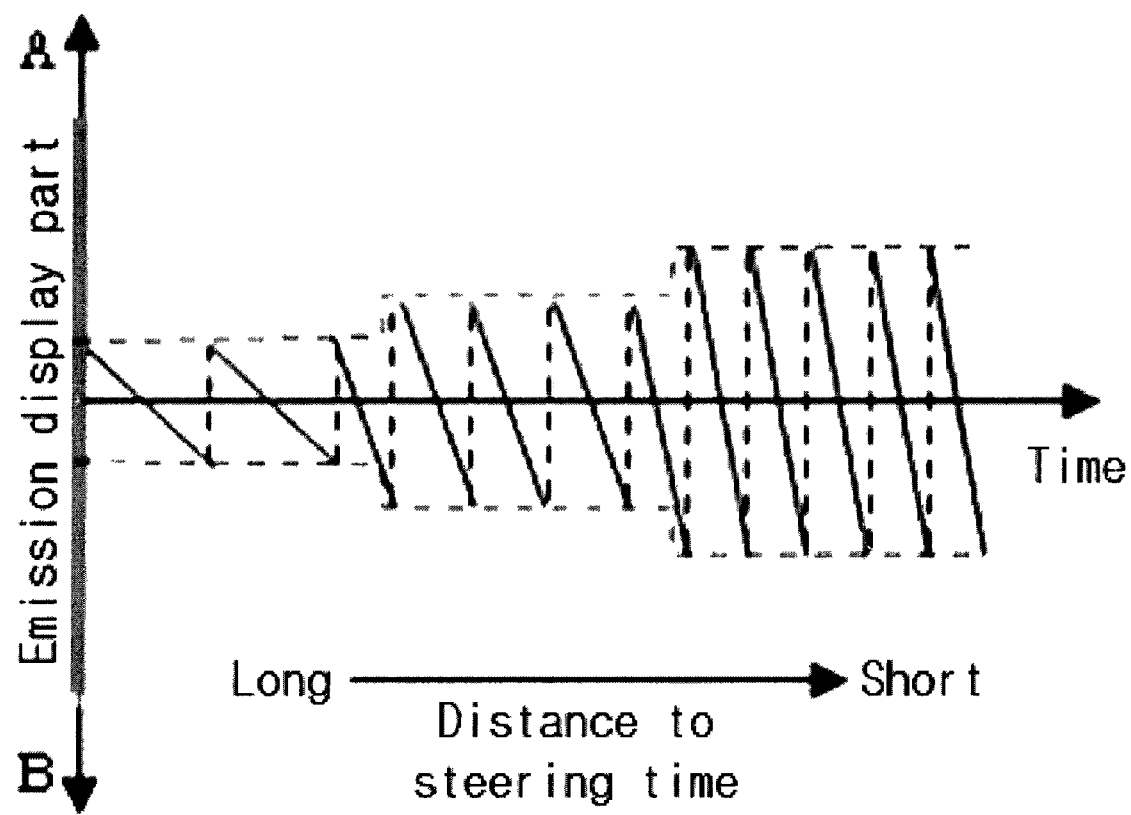

FIG. 17d is the other embodiment of the present invention showing a procedure that as the time length of steering is decreased, the display controller 19 controls the display range and display speed of the emission display part to be step-functionally increased.

In further embodiment, the display controller 18 changes the above-commented display range and/or display speed of the display device, based on a comparison with at least one predefined threshold value.

The displayed contents may include all kinds of alert signals, car speed, engine RPM, power meter, and eco-meter as well as steering information.

Figure 18A:
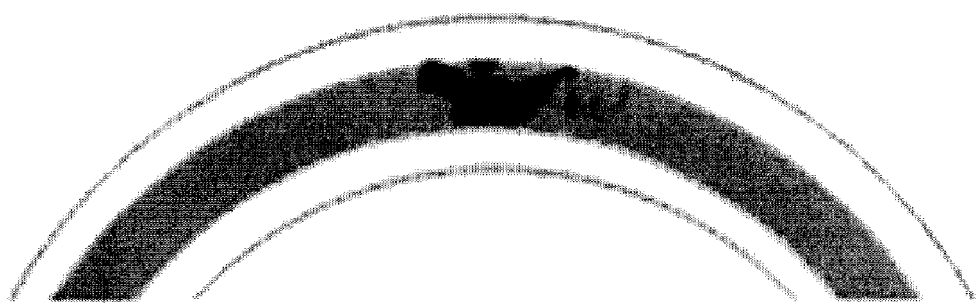
FIG. 18a to FIG. 18e are views showing examples of information displayed by the inventive system.
Figure 18B:
Figure 18C:
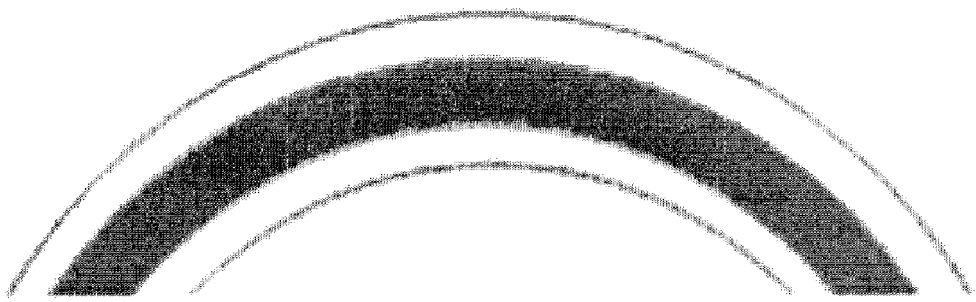
Figure 18D:
Figure 18E:

FIG. 18a to FIG. 18e are some exemplary embodiments expressing concrete information of the steering information as mentioned above according to the present invention. FIG. 18a shows an alarm display. FIG. 18b shows vehicle speed. FIG. 18c to FIG. 18e demonstrates a display based on the comparison of vehicle speed with at least one predefined threshold value.

As shown in FIG. 18a to FIG. 18e, color changes can be used to show the steering information.

As is seen from the forgoing description, the display system for a steering wheel of a vehicle according to the present invention has following effects:

1) Information is displayed on the periphery of the steering wheel, where it has excellent visibility.

2) Although the driver rotates the steering wheel, the information is always displayed at a desired position of the steering wheel, where it has excellent visibility.

3) The information is displayed through irradiation. Accordingly, it is not necessary to use a steering angle sensor or a calculator in order to display the information.

4) When a position of the steering wheel is adjusted, it is not necessary to adjust an optical axis of the irradiation unit.

5) Since no electric components are disposed on moving parts, efficiency is excellent.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A display system for a steering wheel of a vehicle, the steering wheel being rotatably mounted to a steering column, the system comprising:
   a vehicle information acquiring unit for acquiring vehicle information;
   an irradiation unit mounted to the steering column such that the irradiation unit is stationary during rotation of the steering wheel;
   a display device mounted to the steering wheel; and
   a display controller for controlling display content based on the vehicle information;
   wherein the irradiation unit transmits light to send the display content to the display device mounted to the steering wheel.

2. The display system according to claim 1, wherein the irradiation unit moves along the steering column in positioning or tilting the steering wheel.

3. The display system according to claim 1, wherein the predetermined position is substantially near a top of the steering wheel.

4. The display system according to claim 1, wherein the irradiation unit comprises a member selected from the group consisting of a laser diode, a high luminance light emitting diode, and a thin panel display device.

5. The display system according to claim 1, wherein the display device comprises a member selected from the group consisting of an optical transmittance member disposed at substantially an entire cross section of the steering wheel, an optical transmittance member disposed through the cross section in a substantially straight line, an optical transmittance member disposed through the cross section in a curve, an optical transmittance member installed at a surface of the cross section, and optical transmittance member installed interior to the cross section.

6. The display system according to claim 1, wherein the display content comprises at least one of a steering direction, a steering amount, and a steering timing.

7. The display system according to claim 1, wherein the vehicle information acquiring unit comprises at least one of a lane maintenance device, a lane deviation alarm device, a park support device, a navigation device, and an instrument panel controller for controlling information on an instrument panel.

8. The display system according to claim 1, wherein the display device displays at least one of an alert signal, a car speed, an engine speed, a power meter, and an eco-meter.

9. The display system according to claim 1, wherein the display controller changes the display range and/or display speed of the display device in accordance with a driver's steering amount and/or time length of steering.

10. The display system according to claim 1, wherein the irradiation unit is disposed at a position along the steering column that is substantially near a driver's seat.

11. The display system according to claim 1, wherein the steering column comprises a recess, wherein the irradiation unit is disposed therein.

12. The display system according to claim 1, wherein the steering column comprises a barrier configured to shade a driver's eyes from diffused light.

13. A display system for a steering wheel of a vehicle, the steering wheel being rotatably mounted on a steering column, the system comprising:
- a vehicle information acquiring unit for acquiring vehicle information;
- an irradiation unit mounted to the steering column such that the irradiation unit is stationary during rotation of the steering wheel;
- a display device mounted to the steering wheel;
- a steering information detecting unit for detecting a steering direction and/or a steering amount of the steering wheel;
- a display portion calculating unit for calculating a display range and/or a display speed displayed by the display device based on the steering information; and
- a display controller for controlling display content, based on the information acquired by the vehicle information acquiring unit and a result calculated by the display portion calculating unit.

14. The display system for the steering wheel of the vehicle according to claim 13, wherein the display controller determines the display range and/or the display speed displayed by the display device based on a driver's steering amount and/or time length of steering 15. The display system for the steering wheel of the vehicle according to claim 13, wherein the display device displays the steering direction and/or the steering amount.

16. A display method for a steering wheel of a vehicle, comprising:
- acquiring vehicle information;
- detecting a steering direction and/or a steering amount of the steering wheel;
- calculating a display range and/or a display speed to be displayed by the display device based on the steering information;
- controlling content to be displayed, based on information acquired by the vehicle information acquiring unit and a result calculated by the display portion calculating unit; and
- displaying the steering direction, the steering amount, and/or the steering time at a position on the steering wheel that is stationary during rotation of the steering wheel.

17. The method according to claim 16, wherein the acquiring vehicle information comprises acquiring information on lane maintenance and lane deviation.

18. The method according to claim 16, wherein the acquiring vehicle information comprises determining the steering direction according to a difference between a destination track and a traveling track estimated from a steering angle.

19. The method according to claim 16, wherein the acquiring vehicle information comprises determining the steering direction according to route direction information.

20. The method according to claim 16, wherein the calculating of the display range and/or the display speed to be displayed by the display device is determined in accordance with a driver's steering amount and/or time length of steering.

21. A display method for a steering wheel of a vehicle, the method comprising:
- acquiring vehicle information;
- controlling content to be displayed, based on the vehicle information; and
- displaying a state of the vehicle at a position on the steering wheel that is stationary during rotation of the steering wheel;
- wherein displaying the state of the vehicle comprises changing a display range and/or a display rate based on a comparison of the vehicle information with at least one predefined threshold value.

22. The display method for the steering wheel of the vehicle, according to claim 21, further comprises deciding the display range and/or the display speed to be displayed by the display device determined in accordance with a driver's steering amount and/or time length of steering.

* * * * *